United States Patent

Inoue et al.

[11] Patent Number: 4,848,086
[45] Date of Patent: Jul. 18, 1989

[54] BOOST PRESSURE CONTROL METHOD FOR A SUPERCHARGED INTERNAL COMBUSTION ENGINE

[75] Inventors: Kazuo Inoue, Tokyo; Osamu Kubota, Saitama; Noriyuki Kishi; Atsushi Katoh, both of Tokyo, all of Japan

[73] Assignee: Honda Giken Kogyo Kabushiki Kaisha, Tokyo, Japan

[21] Appl. No.: 121,939

[22] Filed: Nov. 18, 1987

[30] Foreign Application Priority Data

| Nov. 19, 1986 | [JP] | Japan | 61-275785 |
| Nov. 19, 1986 | [JP] | Japan | 61-275784 |
| Nov. 19, 1986 | [JP] | Japan | 61-275783 |
| Nov. 19, 1986 | [JP] | Japan | 61-275782 |

[51] Int. Cl.⁴ .............................................. F02B 37/12
[52] U.S. Cl. .................................... 60/602; 123/564
[58] Field of Search ............... 60/600, 601, 602, 603, 60/64; 123/559.3, 564

[56] References Cited

U.S. PATENT DOCUMENTS

| 3,068,638 | 12/1962 | Birmann . | |
| 4,291,535 | 9/1981 | Goloff | 60/602 |
| 4,428,199 | 1/1984 | Moore et al. | 60/600 |
| 4,459,809 | 7/1984 | Tadokoro et al. | 60/602 |
| 4,467,607 | 8/1984 | Rydquist et al. | 60/602 |
| 4,471,742 | 9/1984 | Kishi . | |
| 4,509,331 | 4/1985 | Hirabayashi | 60/602 |
| 4,671,068 | 6/1987 | Moody et al. | 60/602 |
| 4,697,421 | 10/1987 | Otobe et al. | 60/602 |
| 4,741,163 | 5/1988 | Hidaka et al. | 60/602 |

FOREIGN PATENT DOCUMENTS

| 238144 | 9/1987 | European Pat. Off. | 60/602 |
| 212626 | 10/1985 | Japan | 60/602 |
| 259724 | 12/1985 | Japan | 60/602 |

*Primary Examiner*—Michael Koczo
*Attorney, Agent, or Firm*—Lyon & Lyon

[57] ABSTRACT

The boost pressure of a blower such as a turbocharger or a supercharger which is driven by the exhaust gas or the power output from an engine is controlled under closed-loop control when the boost pressure is in a steady state, and under open-loop control when the boost pressure is in a transient state. When the boost pressure is in the transient state, the open-loop control which may be map control is carried out for relatively good accuracy and high stability. When the boost pressure is in the steady state, the closed-loop control, i.e., highly accurate feedback control, is effected. Therefore, an improved response and stability can be achieved in boost pressure control.

6 Claims, 5 Drawing Sheets

BOOST PRESSURE CONTROL METHOD FOR A SUPERCHARGED INTERNAL COMBUSTION ENGINE

BACKGROUND OF THE INVENTION

The present invention relates to a method of controlling the boost pressure of a blower, known as a supercharger or a turbocharger, associated with an internal combustion engine.

Blowers such as superchargers or turbochargers are generally driven by the power output from the output shaft of or the exhaust gases emitted from engines. As the rotational speed of the engine goes higher, the driving force for the blower is also increased and the boost pressure thereof becomes higher. Since an excessive boost pressure would cause troubles such as knocking, it would be preferable to control the boost pressure at an optimum level under all conditions. In the supercharger operated by the engine power output, the boost pressure can be controlled by selectively applying and cutting off the driving force to and from the supercharger or opening and closing a bypass valve. In the turbocharger operated by the engine exhaust gases, the boost pressure can be controlled by adjusting movable vanes to restrict the exhaust gas supplied to the turbine wheel or selectively opening and closing a wastegate.

All types of blowers are subject to a certain type delay in the response of the boost pressure to the engine rotational speed or the throttle valve. Therefore, under normal feedback control, the boost pressure that is controlled tends to overshoot excessively or undergo hunting if control characteristics are not appropriate. If the feedback control were to be stabilized so as to be less responsive to the parameters, the response of the control system would be greatly impaired. It has been found that the intake air temperature and the atmospheric pressure are important as control parameters.

Where open-loop control such as map control is relied upon, no control stability problem occurs. Since, however, many parameters are involved and many map addresses or locations are required, a control unit used should have a large memory capacity and may be retarded in its response speed.

SUMMARY OF THE INVENTION

It is an object of the present invention to provide a method of controlling the boost pressure of a blower with stability and good response.

According to the present invention, there is provided a method of controlling the boost pressure of a blower driven by the exhaust gas or the power output from an engine, comprising the steps of controlling the boost pressure under closed-loop control when the boost pressure is in a steady state, and controlling the boost pressure under open-loop control when the boost pressure is in a transient state.

When the boost pressure is in the transient state, the open-loop control which may be map control is carried out for relatively good accuracy and high stability. When the boost pressure is in the steady state, the closed-loop control, i.e., highly accurate feedback control is effected. Therefore, the response and stability can be achieved in boost pressure control.

The open-loop control is effected on the basis of map values which are updated by data obtained in the closed-loop control. The map values are updated for each of different temperatures of intake air supplied to the engine. Since the intake air temperature is important as a control parameter, the accuracy of controlling the boost pressure in the open-loop control is increased.

A target boost pressure is varied as a function of the rate of change of the actual boost pressure in the closed-loop control. By thus varying the target boost pressure, the actual boost pressure can be caused to quickly converge to the target boost pressure.

The boost pressure is controlled to reach a target boost pressure by adjusting a command value as a function of the temperature of intake air supplied to the engine or the atmospheric pressure. By adjusting the command value as a function of the important parameter, the boost pressure can quickly and stably be converged to the target boost pressure irrespective of environments in which the engine operates.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
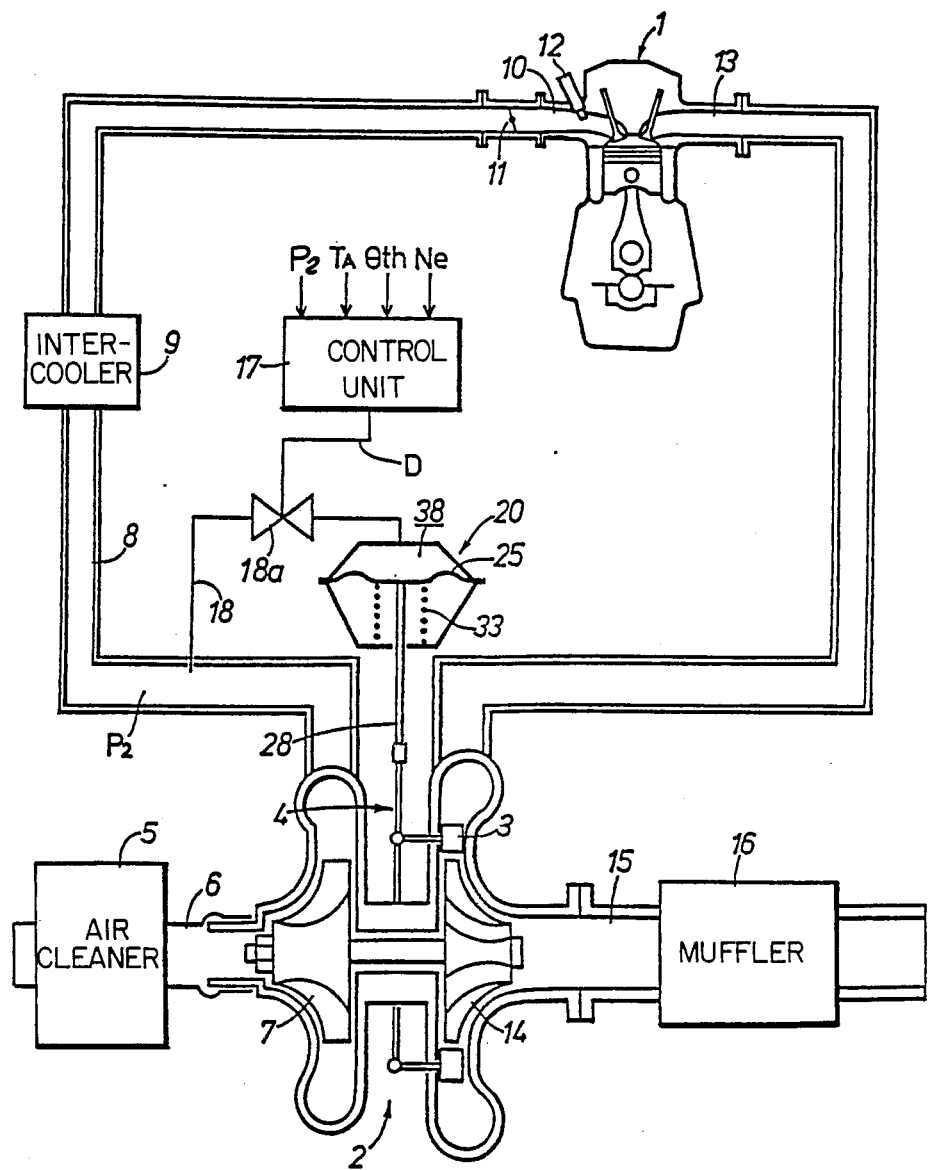
FIG. 1 is a schematic view of a blower system for charging air into the cylinders of an internal combustion engine.

FIG. 1 schematically shows a blower system for forcibly supplying air into the cylinders of an internal combustion. Only one of the engine cylinders is illustrated in FIG. 1 for the sake of brevity.

Intake air to be supplied to an internal combustion engine 1 is delivered from an air cleaner 5 through an intake passage 6 to a compressor wheel 7 of a blower 2, shown as a turbocharger, from which the air is supplied through an intake passage 8, an intercooler 9, a throttle body housing a throttle valve 11, and an intake passage 10 into a combustion chamber of the engine 1. A fuel injection valve 12 is disposed in the intake passage 10 downstream of the throttle valve 11. Exhaust gases discharged from the combustion chamber are delivered through an exhaust passage 13 into a turbine wheel 14 of the blower 2. After the exhaust gases have released the energy to rotate the compressor wheel 7, the exhaust gases are discharged via an exhaust passage 15 and a muffler 16 into the atmosphere. A variable nozzle 3 comprising a number of vanes arranged in an annular pattern is disposed immediately upstream of the turbine wheel 14. The speed of flow of the exhaust gases toward the turbine wheel 14 can be adjusted by varying the amount of opening of the variable nozzle 3 with an adjusting mechanism 4.

The adjusting mechanism 4 is actuated by an actuator 20 having a positive pressure chamber 38 defined by a positive pressure diaphragm 25 normally urged to move in one direction by a coil spring 33. The positive pressure chamber 38 is connected to the intake passage 8 upstream of the throttle valve 11 through a pipe 18 having a control valve 18a. The control valve 18a can be opened and closed under the control of a control unit 17 supplied with the intake air temperature TA, the intake boost pressure P2, the engine rotational speed Ne and the throttle opening $\theta$th as parameters.

The control unit 17 may comprise a digital central processing unit (CPU) that can be programmed to perform various control methods as will be described later on.

A rod 28 is fixed to the center of the diaphragm 25 of the actuator 20 and has an end coupled to the adjusting mechanism 4.

The control valve 18a is controlled in its duty ratio by the control unit 17.

Figure 2:
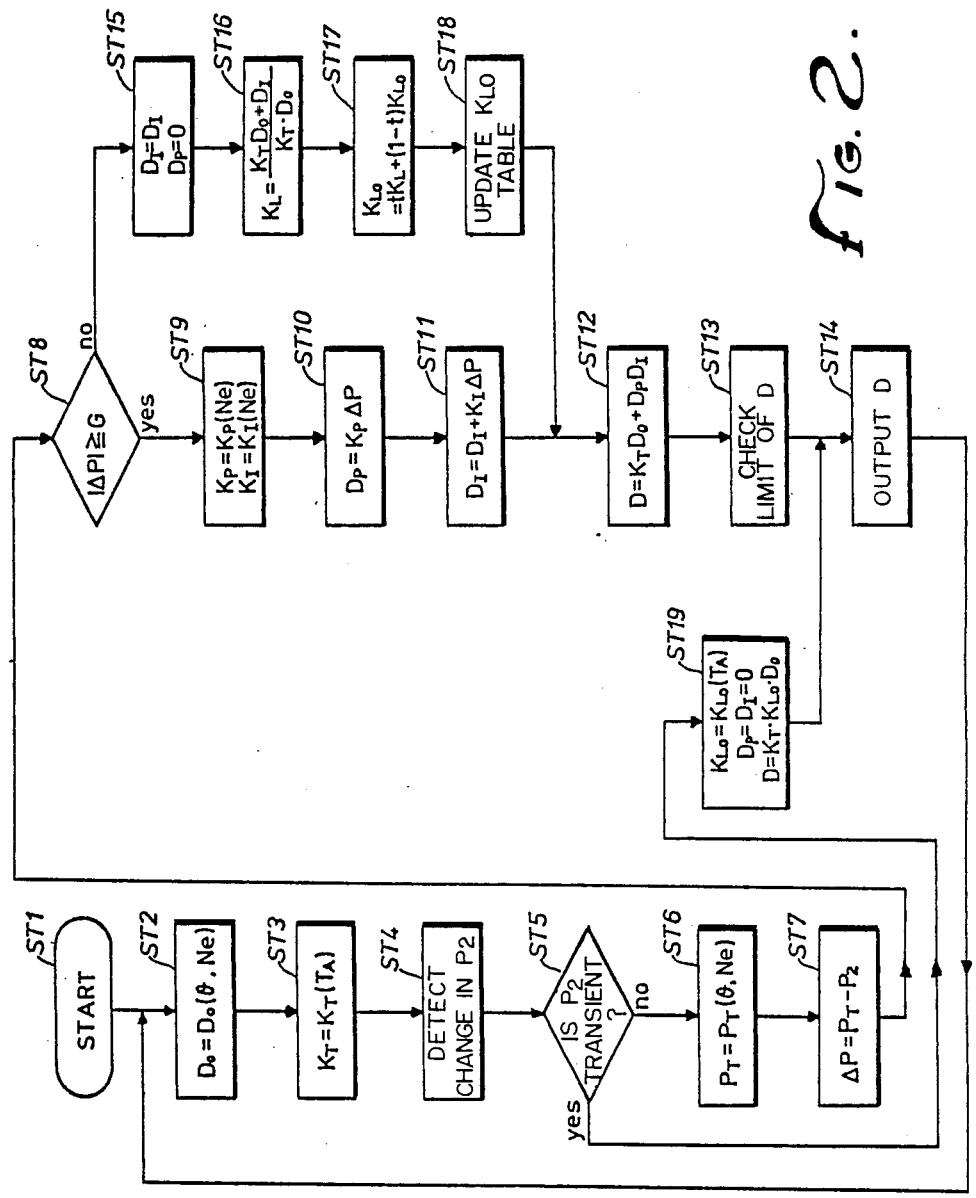
FIG. 2 is a flowchart of a control sequence of a boost pressure control method according to an embodiment of the present invention.

FIG. 2 shows a control sequence or program which is executed by the control unit 17 to generate a control signal D for controlling the control valve 18a.

When a power supply is switched on, the variables are cleared and the control unit performs self-diagnosis in a step 1, identified as "ST 1" and each of the subsequent steps are identified in the drawings by "ST" followed by the number of that step. Then, a temporary control signal D0 is read in a step 2 from a map in the control unit 17 based on the throttle opening $\theta$ and the engine rotational speed Ne which are applied to the control unit 17. In a next step 3, a constant KT for intake air temperature compensation is read out from a table in the control unit 17 based on the intake air temperature TA applied to the control unit 17. A step 4 detects a change in the present boost pressure P2 of the blower 2, and a next step 5 ascertains whether the boost pressure P2 is in a transient state or not. If the boost pressure P2 is in a steady state, then a target boost pressure PT is read from a table based on the present parameters $\theta$, Ne in a step 6. A step 7 finds the difference delta-P between the target boost pressure PT and the present boost pressure P2, followed by a step 8 which ascertains whether or not the absolute value of the difference delta-P is equal to or greater than G, i.e., whether the boost pressure P2 has been controlled at the boost pressure setpoint PT within an allowable range ($\pm$G) or not.

If the absolute value of delta-P is equal to or greater than G, then constants KP, KI for proportional and integral control are found from a table based on the engine rotational speed Ne in a step 9. The control signal D is corrected in a step 12 by corrective quantities DP, DI that are calculated by the constants KP, KI, respectively, in successive steps 10, 11. In the step 12, the temperature compensation constant KT obtained in the step 3 is taken into account. Then, the limit of the control signal D is checked in a step 13, and then the control signal D is issued in a step 14 to control the control valve 18a. Thereafter, control goes back to the step 2. The limit checking for the control signal D is effected in view of the nonlinearity of the diaphragm 25 actuator 20 so that the value of the control signal D will forcibly be kept within a range in which the actuator has a substantially linear characteristic.

If the absolute value of delta-P is smaller than G in the step 8, i.e., if the present boost pressure P2 has reached substantially the target boost pressure PT, then the corrective quantity DI which has been employed in the preceding cycle is retained as it is, and the corrective quantity DP is set to zero, in a step 15. A next step 16 calculates a ratio KL between the value of the present control signal D and the output value of a control signal given from the map value D0 only. In a step 17, a corrective coefficient KL0 up to now is updated using a prescribed weighting coefficient t ($0 \leq t \leq 1$) and the newly obtained corrective coefficient KL.

Figure 3:
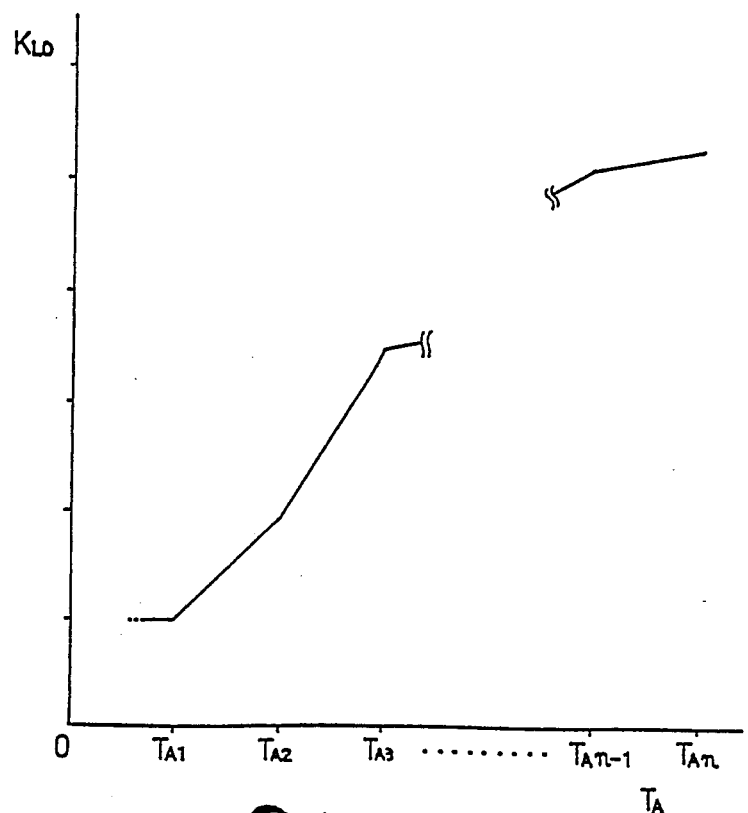
FIG. 3 is a graph showing a table of corrective coefficients vs. intake air temperatures, employed in the boost pressure control method.

The correcting coefficient KL0 is dependent on the engine rotational speed Ne, the throttle opening $\theta$, and the intake air temperature TA, but is strongly affected by the intake air temperature TA in particular. In view of this, a table of corrective coefficients KL0 vs. intake air temperatures TA as shown in FIG. 3 is updated for each of present intake air temperatures TA1, ..., TAn in a step 18. Then, control returns to the aforesaid control loop by going to the step 12.

If the boost pressure P2 is in the transient state in the step 5, then the corrective coefficient KL0 is read out of the KL0 table, the control quantities DP, DI are set to zero, and the control signal D is set to D=KT.KL0.D0 in a step 19, which is followed by the step 14. Therefore, in the event that the boost pressure P2 is in the transient state, e.g., it is abruptly changed, open-loop control such as map control is carried out. Since a value updated in the step 18, i.e., a value obtained by experience, is used as KL0 in such open-loop control, the control process is highly accurate regardless of the fact that the stability of the control system is high. The map control is of high accuracy because the corrective coefficients KL0 are established for respective different intake air temperatures TA1, ..., TAn.

Figure 4:
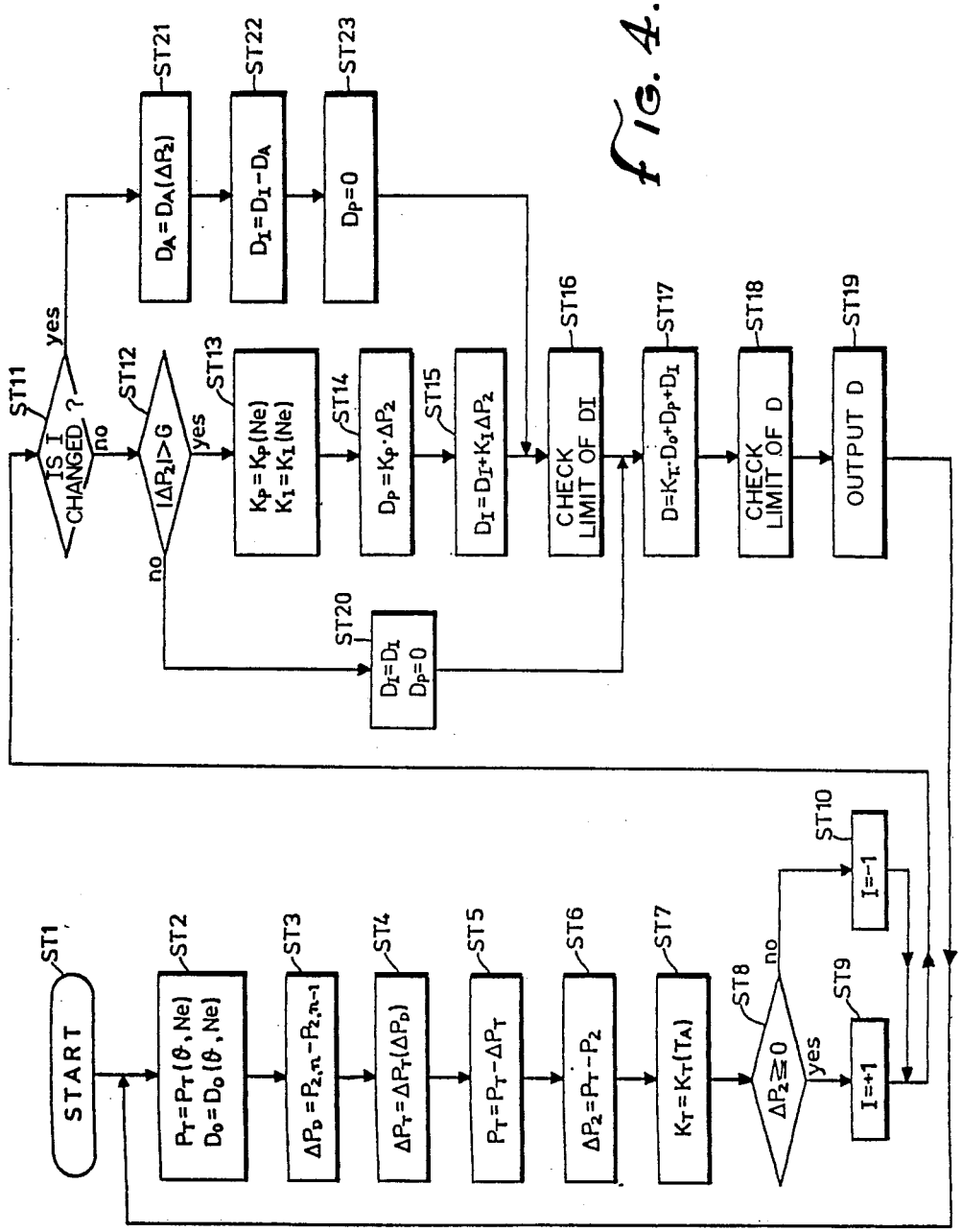
FIG. 4 is a flowchart of a control sequence of a boost pressure control method according to another embodiment of the present invention.

FIG. 4 shows a flowchart of a control sequence of a boost pressure control method according to another embodiment of the present invention. When a power supply is switched on, the variables are cleared and the control unit performs self-diagnosis in a step 1. Then, a temporary target boost pressure PT and a temporary control signal D0 are read from maps in the control unit 17 based on the throttle opening $\theta$ an the engine rotational speed Ne in a step 2. A next step 3 determines the difference delta-PD between a present boost pressure P2,n and a preceding boost pressure P2,n-1.

In a step 4, an increase delta-PT in the target boost pressure PT is read out of a table in the control unit 17 as a function of delta-PD, i.e., the rate of change of the boost pressure. Then, the target boost pressure PT is corrected by a quantity commensurate with the increase delta-PT in a step 5. The difference delta-P2 between the target boost pressure PT and an actual boost pressure P2 is determined in a step P6, followed by a step 7 in which a constant KT for intake air temperature compensation is read out from a table in the control unit 17 based on the intake air temperature TA applied to the control unit 17. A step 8 ascertains whether or not delta-P2 is equal to or greater than zero. If delta-P2 is equal to or greater than zero, i.e., if the actual boost pressure P2 is equal to or lower than the target boost pressure PT, then an indicator I is set to +1 in a step 9. If delta-P2 is smaller than zero, i.e., if the actual boost pressure P2 is higher than the target boost pressure PT, then the indicator I is set to −1 in a step 10.

A next step 11 ascertains whether the indicator I is changed or not from the preceding value. If not, i.e., if the actual boost pressure P2 does not cross the target boost pressure P, then a step 12 ascertains whether the absolute value of delta-P2 is greater than a constant G or not. If the absolute value of delta-P2 is greater than the constant G, i.e., if the actual boost pressure P2 should be adjusted to approach the target boost pressure PT, then constants KP, KI for proportional and integral control are found from a table based on the engine rotational speed Ne in a step 13. Corrective quantities DP, DI are calculated by the constants KP, KI, respectively, in successive steps 14, 15. The limit of the corrective quantity DI is checked in a step 16. Then, a control signal D is calculated from the corrective quantities DP, DI in a step 17 in which the temperature compensation constant KT obtained in the step 7 is also taken into account.

Then, the limit of the control signal D is checked in a step 18. The limit checking for the control signal D is effected in view of the nonlinearity of the diaphragm actuator 20 so that the value of the control signal D will forcibly be kept within a range in which the actuator has a substantially linear characteristic. Then, the control signal D is issued in a step 19 to control the control valve 18a. Thereafter, control goes back to the step 2.

If the indicator I is changed from the preceding value in the step 11, then DA is read from a table in the control unit 17 as a function of delta-P2 in a step 21. The corrective quantity DI for integral control is corrected by DA in a step 22, and the corrective quantity DP for proportional control is set to zero in a step 23, from which control goes to the step 16.

If the absoluted value of delta-P2 is smaller than G in the step 12, i.e., if the actual boost pressure P2 is substantially equal to the target boost pressure PT, then the corrective quantity DI is retained as it is and the corrective quantity DP is set to zero in a step 20 which is then followed by the step 17.

As described above the control method of the present invention is based on proportional plus integral control using the digital CPU. As indicated by the steps 3 through 6 in FIG. 4, when the rate of change delta-P2 of the actual boost pressure P2 is large, the target boost pressure PT is set apart from the actual boost pressure P2. Therefore, control action to bring the actual boost pressure P2 closely to the target boost pressure PT is increased, and the actual boost pressure is caused to converge quickly to the target boost pressure.

As shown in the steps 8 through 11 and 21 through 23 in FIG. 4, when the actual boost pressure P2 crosses the target boost pressure PT, the corrective quantity DI for integral control is reduced, also allowing the actual boost pressure to converge quickly to the target boost pressure.

Figure 5:
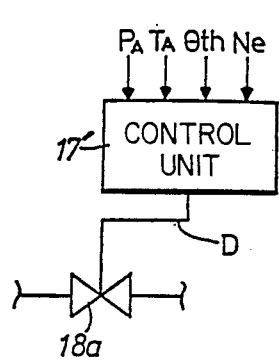
FIG. 5 is a block diagram of a modified control unit.

FIG. 5 illustrates a modified control unit 17' which is supplied with data on atmospheric pressure PA as an additional parameter.

Figure 6A:
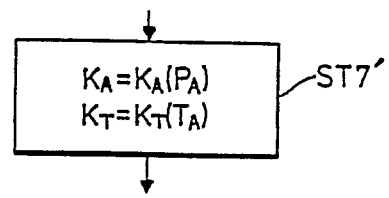
FIG. 6A and 6B show additional steps of a control sequence executed by the control unit shown in FIG. 5.
Figure 6B:
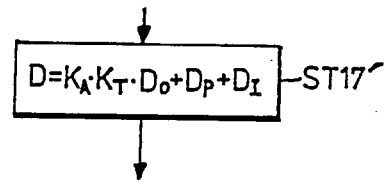

FIGS. 6A and 6B show steps 7', 17', respectively, of a control sequence to be executed by the control unit 17' shown in FIG. 5. The steps 7', 17' are substituted for the respective steps 7, 17 of the control sequence of FIG. 4. In the step 7', constants KT, KA are found from respective tables for intake air temperature compensation and atmospheric pressure compensation based on the intake air temperature TA and the atmospheric pressure, PA applied to the control unit 17'. In the step 17', both of the constants KT, KA for intake air temperature compensation and atmospheric pressure compensation, ob- tained in the step 7', are taken into account in calculating the control signal D.

The principles of the present invention have been shown as being applied to the control of the variable nozzle of a turbocharger. However, the control method of the present invention may also be used for controlling the turn-on/-off of the input shaft or the opening/closing of the bypass valve of a supercharger, or the wastegate of a turbocharger, or a two-stage or hybrid blower system employing a plurality of blowers of like or different types.

Although certain preferred embodiments have been shown and described, it should be understood that many changes and modifications may be made therein without departing from the scope of the appended claims.

What is claimed is:

1. A method of controlling the boost pressure of a blower driven by the exhaust gas or the power output from an engine, comprising the steps of:
   controlling the boost pressure under closed-loop control when the boost pressure is in a steady state; and
   controlling the boost pressure under open-loop control when the boost pressure is in a transient state, wherein said open-loop control comprises map control effected on the basis of map values which are updated by data obtained in the closed-loop control.

2. A method of controlling the boost pressure of a blower driven by the exhaust gas or the power output from an engine, comprising the steps of:
   controlling the boost pressure under closed-loop control when the boost pressure is in a steady state; and
   controlling the boost pressure under open-loop control when the boost pressure is in a transient state, wherein said open-loop control comprises map control effected on the basis of map values which are updated by data obtained in the closed-loop control, and wherein said map values are updated for each of different temperatures of intake air supplied to the engine.

3. A method of controlling the boost pressure of a blower driven by the exhaust gas or the power output from an engine, comprising the steps of:
   controlling the boost pressure under closed-loop control when the boost pressure is in a steady state; and
   controlling the boost pressure under open-loop control when the boost pressure is in a transient state wherein a target boost pressure is varied as a function of the rate of change of the actual boost pressure in said closed-loop control.

4. A method according to claim 3, wherein said target boost pressure is set apart from said actual boost pressure by an amount which is substantially proportional to the magnitude of the speed at which the actual boost pressure goes apart from the target boost pressure.

5. A method of controlling the boost pressure of a blower driven by the exhaust gas or the power output from an engine, comprising the steps of:
   controlling the boost pressure under closed-loop control when the boost pressure is in a steady state; and
   controlling the boost pressure under open-loop control when the boost pressure is in a transient state wherein the boost pressure is controlled to reach a target boost pressure by adjusting a command value as a function of the temperature of intake air supplied to the engine and the atmospheric pressure.

6. A method of controlling the boost pressure of a blower driven by the exhaust gas or the power output from an engine, comprising the steps of:

controlling the boost pressure under closed-loop control when the boost pressure is in a steady state; and
controlling the boost pressure under open-loop control when the boost pressure is in a transient state, wherein the boost pressure is controlled to reach a target boost pressure by adjusting a command value as a function of the temperature of intake air supplied to the engine.

* * * * *